(12) United States Patent
Tsai

(10) Patent No.: US 9,092,116 B2
(45) Date of Patent: *Jul. 28, 2015

(54) VISUALIZED INFORMATION CONVEYING SYSTEM

(71) Applicant: Acer Incorporated, New Taipei (TW)

(72) Inventor: Chieh-Chih Tsai, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/107,362

(22) Filed: Dec. 16, 2013

(65) Prior Publication Data

US 2014/0109011 A1 Apr. 17, 2014

Related U.S. Application Data

(63) Continuation of application No. 13/845,855, filed on Mar. 18, 2013, now Pat. No. 8,686,949, which is a continuation of application No. 12/704,534, filed on Feb. 12, 2010, now Pat. No. 8,421,766.

(51) Int. Cl.
| | |
|---|---|
| *G06F 3/0486* | (2013.01) |
| *G06F 9/46* | (2006.01) |
| *G06F 3/0481* | (2013.01) |
| *G06F 9/44* | (2006.01) |
| *G06F 3/0482* | (2013.01) |

(52) U.S. Cl.
CPC .......... *G06F 3/04817* (2013.01); *G06F 3/0482* (2013.01); *G06F 3/0486* (2013.01); *G06F 9/4443* (2013.01)

(58) Field of Classification Search
CPC ................. G06F 3/0486; G06F 9/46
USPC .......... 345/156, 169, 173; 715/771, 777, 812, 715/762

See application file for complete search history.

(56) References Cited

U.S. PATENT DOCUMENTS

| | | |
|---|---|---|
| 6,597,314 B1 | 7/2003 | Beezer et al. |
| 6,973,624 B2 | 12/2005 | Miksovsky et al. |
| 7,415,666 B2 | 8/2008 | Sellers et al. |
| 7,426,703 B2 | 9/2008 | Cheung et al. |
| 7,428,530 B2 | 9/2008 | Ramarathnam et al. |
| 7,496,830 B2 | 2/2009 | Rubin et al. |
| 7,548,909 B2 | 6/2009 | Rappaport et al. |

(Continued)

FOREIGN PATENT DOCUMENTS

CN 101321251 12/2008

OTHER PUBLICATIONS

Chinese Office Action dated Jun. 5, 2012, 5 pages.

(Continued)

*Primary Examiner* — Ricardo L Osorio
(74) *Attorney, Agent, or Firm* — Edell, Shapiro & Finnan, LLC

(57) ABSTRACT

A handheld communication device having a logic to transfer information from a first application to a second application by using a user interface which displays a screen shot of the information gathered at the first application, and the interface also displays a list of icons indicative of other applications that is capable of receiving such information and using such information. The logic is configured to transfer the information to the second application by a drag-and-drop motion on the interface page.

20 Claims, 3 Drawing Sheets

(56) References Cited

U.S. PATENT DOCUMENTS

| | | |
|---|---|---|
| 7,565,538 B2 | 7/2009 | Gray et al. |
| 7,574,669 B1 | 8/2009 | Braun et al. |
| 7,664,739 B2 | 2/2010 | Farago et al. |
| 8,269,728 B2 | 9/2012 | Bolt et al. |
| 2003/0058275 A1* | 3/2003 | Pilu et al. .................. 345/751 |
| 2005/0262521 A1* | 11/2005 | Kesavarapu ............... 719/320 |
| 2007/0208765 A1* | 9/2007 | Li et al. ..................... 707/101 |
| 2008/0034079 A1* | 2/2008 | Kodosky et al. ........... 709/223 |
| 2008/0263455 A1* | 10/2008 | Stults et al. ................ 715/748 |
| 2009/0288037 A1* | 11/2009 | Lawton et al. ............. 715/804 |
| 2010/0255900 A1* | 10/2010 | Ansari et al. ................. 463/25 |

OTHER PUBLICATIONS

English language abstract of CN101321251, Dec. 12, 2008, 1 page.
Chinese Office Action, Jul. 3, 2013, 5 pages.

* cited by examiner

VISUALIZED INFORMATION CONVEYING SYSTEM

CROSS-REFERENCE TO RELATED APPLICATIONS

This application is a continuation of U.S. application Ser. No. 13/845,855, filed on Mar. 18, 2013, which is a continuation of U.S. application Ser. No. 12/704,534, filed Feb. 12, 2010, now U.S. Pat. No. 8,421,766, the entireties of which are incorporated herein by reference.

BACKGROUND OF THE INVENTION (1) Field of the Invention

The field of the invention is a method of manipulating data between applications on an handheld electronic devices.

(2) Description of Related Art Including Information Disclosed Under 37 CFR 1.97 and 1.98

Generally known methods of obtaining data from one application for use in another application require a user to go through multiple procedural steps. For example, as shown in FIG. 1, a Windows PC user who intends on emailing a content of a website 10 to a friend will need to move the cursor to "file," click on "file" for a pull down menu 11, and then move the cursor to "send to" and initiate another pull down menu 12, and then move the cursor to "page by E-mail," and then click on "page by E-mail."

Similarity, a user could also use copy-and-paste function to copy information from one application to paste onto another application. This typically requires the user to manually select and choose a copy function, close one application, open another application, then manually select and chose a paste function.

When the applications are utilized on a single window handheld device, these required steps become very tedious and time consuming.

Thus, there is still a need for relatively more efficient ways to retrieve data from one application for use in another application.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The invention may seek to satisfy one or more of the above-mentioned desires. Although the present invention may obviate one or more of the above-mentioned desires, it should be understood that some aspects of the invention might not necessarily obviate them.

BRIEF SUMMARY OF THE INVENTION

Among the many different possibilities contemplated, an electronic device, such as a handheld communication device, is contemplated to have a logic that transfers information from a first application to a second application, wherein both the first and the second application are run on the electronic device. The contemplated device has an operating system installed in the device, and a touch screen, a processor, a memory in communication with the processor, and a logic configured to display a user interface having a single-page interface page.

In further contemplated embodiments, the single-page interface page displays a first item (e.g., a minimized screen shot) indicative of the information gathered by the first application. In yet other preferred embodiments, the single-page interface page also displays a second item (e.g., an icon) indicative of the second application.

Other embodiments include a single-page interface page that displays more than one icons indicative of multiple numbers of applications capable of receiving the information from the first application.

There are further embodiments where the single-page interface page displays a collection of minimized screen shots, each indicative of information gathered at different times from at least one application.

The most preferred embodiments include a logic configured to transfer the information to the second application by, at most, three physical steps—pressing a hard key, tapping the first item on the touch screen, and use a dragging motion towards the second item.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

It should be noted that the drawing figures may be in simplified form and might not be to precise scale. In reference to the disclosure herein, for purposes of convenience and clarity only, directional terms, such as, top, bottom, left, right, up, down, over, above, below, beneath, rear, front, distal, and proximal are used with respect to the accompanying drawings. Such directional terms should not be construed to limit the scope of the invention in any manner.

DETAILED DESCRIPTION OF THE INVENTION

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below.

Figure 1:
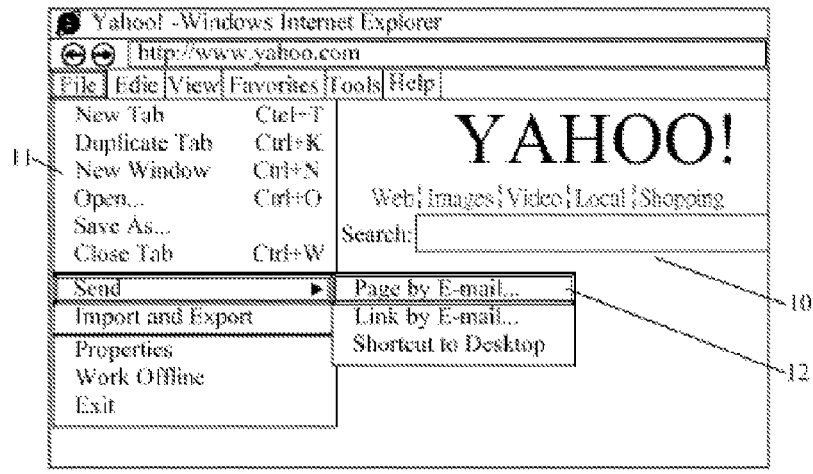
FIG. 1 is a screen shot of illustrating prior art method of sending a URL address from an Internet browser via email to another person.

Referring now to FIG. 1, one way to send a webpage on a PC to another person is to use the browser menu to select an option to email a webpage. As shown in FIG. 1, the user browses into the menu architecture to find this feature. The user uses a web browser 10 and navigates to the file menu 11 of the application in order to find the expanding window 12 used to provide options to send information. Similarly, this can be done on a handheld or single-window device.

Figure 2:
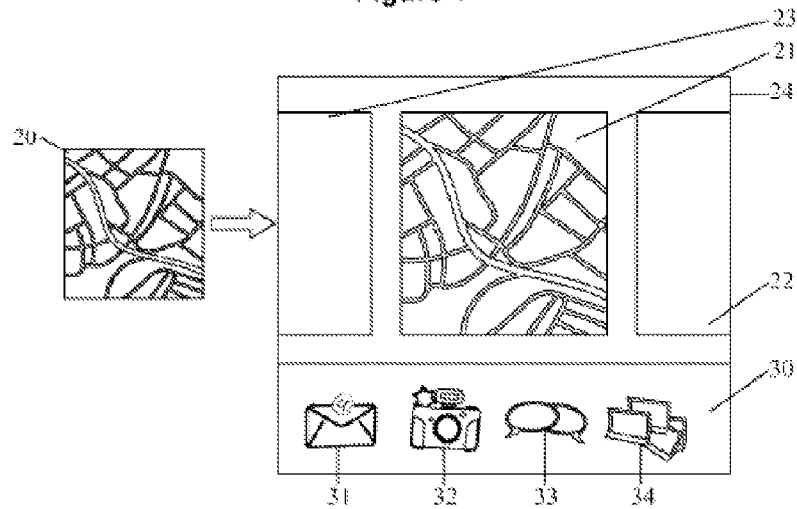
FIG. 2 is an illustration of an embodiment of the present invention, showing the change of a page of the first application, to a single-page interface page.

Referring now to FIG. 2, a preferred embodiment of the instant inventive subject matter is disclosed. Contemplated invention is an electronic device that supports multiple applications and functions. The electronic device has a logic to transfer an information 20 from a first application (20, a mapping application such as Google™ Maps) to a second application (any one of 31, 32, 33, 34), wherein both the first 20 and the second application (any one of 31, 32, 33, 34) are supported on the electronic device.

As used herein, the term "supported," in conjunction with an application on the electronic device, refers to a relationship that the application can function and display on the display screen of the electronic device. This term does not define and does not limit where the applications are installed and processed. The disclosure specifically includes applications that are installed and processed at a server, or at another location away from the electronic device.

As used herein, the term "electronic device" refers to any one of mobile phone (including cellular phone, PDA phone, Smartphone), a personal digital assistant (PDA), a portable media player, a laptop computer, and a desktop computer. In the preferred embodiments, personal mobile devices are used. More preferably, mobile phones are contemplated.

Figure 3:
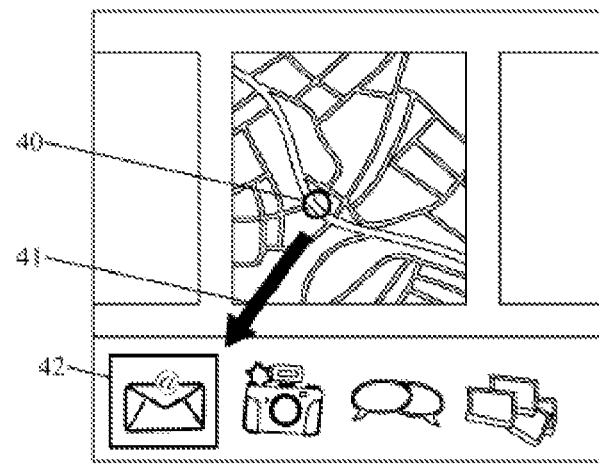
FIG. 3 is an illustration of an embodiment of the present invention, showing a user manipulation on the single-page interface page to transfer information.

Contemplated electronic device has an operating system 54 installed in the device, a screen (as shown by FIG. 3) disposed on the device, a processor 55 disposed in the device, and a memory in communication with the processor.

Further contemplated electronic device has a logic configured to display a user interface having a single-page interface page 24. FIG. 2 shows an example of the interface page 24. The left side of FIG. 2 shows a screen displaying a search result on the Google™ Map application. The right side of FIG. 2 shows that, once a hard key or a single command is given by the user, the screen next displays a single-page interface page 24. In this preferred example, the single-page interface page 24 displays a first item 21 indicative of the information gathered by the first application (20).

In FIG. 2, the screen shows a staging tray (the upper half of the single-page interface page 24) having items 21, 22, and 23. 21 is a screen shot of the previous screen as shown on the left of FIG. 2. Items 22 and 23 can be screen shots or other information gathered from the same first application, or another application from another time. There may be more than just these three items on the staging tray. A simple finger-flipping motion on the touch screen to the right or to the left (as is known in the art) can allow a user to flip through a number of items on the staging tray.

The first item is preferably displayed as an image of the information. For example, a screen shot of a search result of from Google™ Maps.

Also, the single-page interface page 24 also displays a second item 31 indicative of the second application.

In preferred embodiments, this single-page interface page 24 can provide a list of target applications 31, 32, 33, 34 that can receive information previously gathered and placed on the staging tray. These target application can include an email application 31, an photo management application (e.g., photo album) 34, a multi-media management application, an audio management application, an address book application, a note-taking application, an instant messaging application 33, a Multimedia Messaging Service (MMS) application 32, a short messaging service (SMS) application, an internet browser, and a third-party application.

Although only four target applications are shown in FIG. 2, there may be more than just these four target application on the target tray 30. A simple finger-flipping motion on the touch screen in the target tray 30 to the right or to the left (as known in the art) can allow a user to flip through a number of icons for various target applications on the target tray 30.

As used herein, the term "information" refers to any representation of data such as a screen shot, an image file, a photo file, a URL link, a webpage, a vCard, a text file, and a group of text.

Contemplated inventive subject matter includes a logic configured to transfer the information to the second application by a user's manipulation between the first item 21 and the second item (any one of 31, 32, 33, 34) on the single-page interface page 24.

In the example as illustrated in FIG. 2, a user is at first using Google™ Maps 20 on his single window mobile phone to look up an address. When he finds it and desires to send the map to another person via e-mail, it takes no more than three user-initiated physical steps to bring the desired information into an email application for further processing (example of further processing: the user will next type in the recipient's email address and hit "send.").

In other words, the information transfer step can be performed by the logic when a user instruction of no more than three user-initiated physical motion steps are detected by the electronic device.

Step 1:

In the example, the user leaves Google™ Maps 20 (preferably temporarily) by pressing a hard key or via context menu. This action automatically takes a screenshot of the search result from the displayed Google™ Maps 20 page, and places it on the next page. On the next page, he sees a single-page interface page 24 containing a staging tray having several screenshots 21, 22, and 23. The screenshot 21 in the middle is the screenshot of the map he wants to email to another person. The target tray 30 includes icons of several destination (target) applications 31, 32, 33, 34 to receive the screen shot 21. This completes the first user-initiated physical step—pressing a hard key or via context menu.

Steps 2 and 3:

The user "moves" 41 screenshot 21 to email application icon 31. FIG. 3 illustrates the "move" in more details.

In one embodiment, the "move" requires a touch screen, and the user touches 40 screenshot 21 on the touch screen followed by touching 42 the email icon 31 on the touch screen. This "move" does not necessarily require a "dragging" of the user's finger from spot 40 to spot 42. The move 41 is completed by two tapping of the spot 40 followed by tapping of spot 42. This can be done using only one finger, for example.

In yet another embodiment, a tapping 40 and 42 on the touch screen in both spots 40 and 42 on the touch screen with some overtime in time is required. In other words, a continuous touching of the screen between the time the user touches spot 40 and the user touches the spot 42. This "move" does not necessarily require a "dragging" of the user's finger from spot 40 to spot 42. The move 41 is completed by two tapping of the spot 40 followed by tapping of spot 42, without releasing the touch on spot 40. This cannot be done using only one finger. For example, the user can tap spot 40 using one finger, and while spot 40 is being touched, tap spot 42 using another finger.

In the most preferred embodiment, a tapping 40 of the finger on the touch screen and a dragging 41 of the finger on the touch screen toward the second application 31 is required.

Contemplated tapping on the touch screen can be done by a stylus or by a human finger.

In other embodiments where a mouse is used, for example, the user can move the cursor to screenshot 21, click and hold it, and drag it to email application 31 for emailing it.

Figure 4:
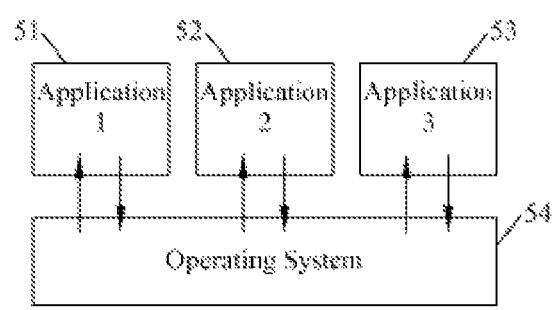
FIG. 4 is a diagram showing transfer of information between three applications on an operating system.

In FIG. 4, an embodiment is shown where the transfer of information to and from three applications 51, 52, 53 is effectuated via operating system 54. A function running a visual system can be placed on the operating system to manage multiple applications and replace the typical copy-and-paste method. By pressing a hard key or using the context menu, the device will save data and allow the user to use additional functions such as drag and drop.

Figure 5:
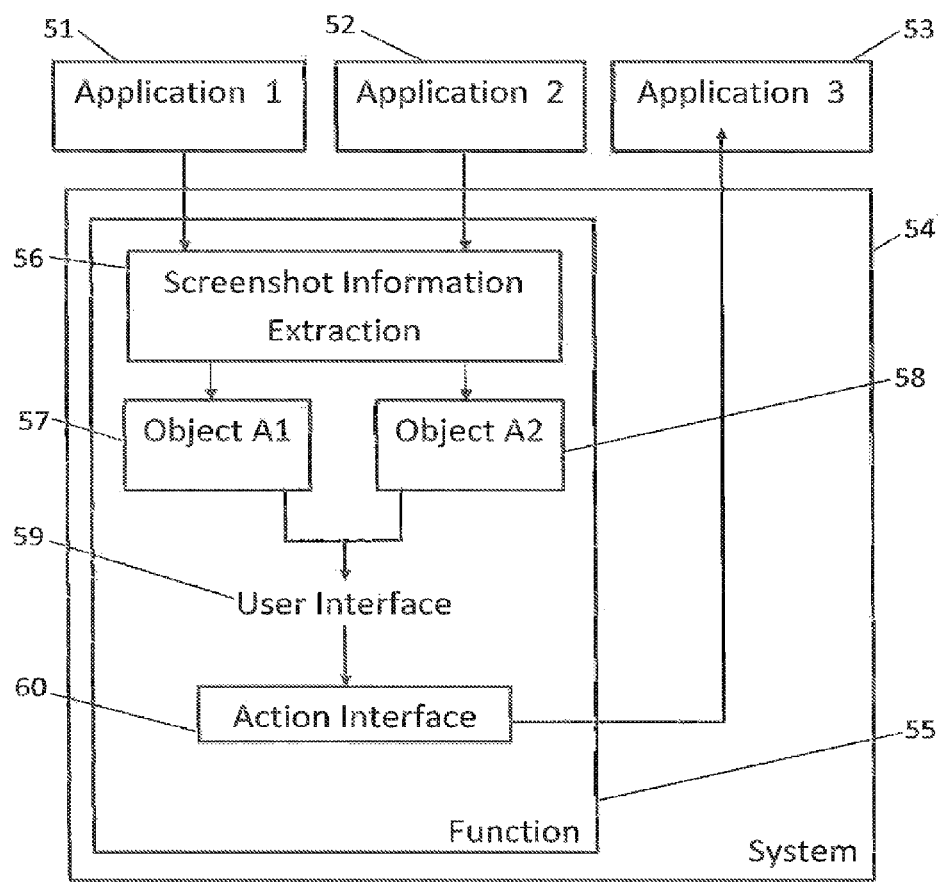
FIG. 5 is a diagram showing transfer of information from two applications to a third application on an operating system.

In FIG. 5, another embodiment is shown where the transfer of information from two applications 51, 52 to a third application 53 is effectuated via operating system 54. Screenshot information is extracted when the user completes step 1 as described above. Object A1 and Object A2 (57 and 58) are then carried over to user interface 59 (previously described as single page interface page 24). The user then performs steps two and three as previously described (action interface step 60) to pass information to the third application 53.

The contemplated function 55 provides a way to extract 56 information (objects 57, 58) such as text or pictures in the application. Additionally, the function provides a user Using this function, an action interface 60 runs on the system, separate from the applications 51, 52, 53 to provide a menu to automatically execute communicative tasks to other applications or transmit information. By doing this, the exchange of information between applications is handled by the function 55. This action interface 59 enables the user to drag and drop objects from several applications or instances of an application.

Thus, specific embodiments and applications of Visualized Information Conveying System have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the invention. In addition, where the specification and claims refer to at least one of something selected from the group consisting of A, B, C . . . and N, the text should be interpreted as requiring only one element from the group, not A plus N, or B plus N, etc.

What is claimed is:

1. An electronic device, comprising:
   a processor;
   a memory in communication with the processor;
   a screen;
   an operating system;
   a first logic configured to display on the screen a user interface that displays a first item outputted by a first application;
   wherein the user interface also simultaneously displays an icon indicative of a second application; and
   a second logic configured to:
   generate a selected item from the first item at the same time that the icon is being displayed; and
   enable the second application to utilize the selected item in response to selection of the icon.

2. The electronic device as recited in claim 1, wherein the selected item is generated by selecting the first item.

3. The electronic device as recited in claim 1, wherein the first item is an image outputted by the first application.

4. The electronic device as recited in claim 1, wherein the second logic is configured to enable the second application to utilize the selected item by receiving the selected item in response to selection of the icon.

5. The electronic device as recited in claim 1, wherein the selected item is utilized by the second application by pressing the icon.

6. The electronic device as recited in claim 1, wherein the second application is a photo management application.

7. The electronic device as recited in claim 1, wherein the second application is configured to display the selected item, to edit the selected item, or both.

8. The electronic device as recited in claim 1, wherein the second logic is further configured to store the selected item in the memory.

9. The electronic device as recited in claim 8, wherein the second logic is configured to enable the second application to utilize the selected item by extracting the selected item from the memory.

10. The electronic device as recited in claim 1, wherein the second logic is configured to enable the second application to utilize the selected item by extracting the selected item from the first application.

11. A method comprising:
   displaying, on a display, a first item outputted by a fist application;
   simultaneously displaying an icon indicative of a second application;
   generating a selected item from the first item that is displayed on the display; and
   enabling a second application to utilize the selected item in response to selection of the icon indicative of the second application, wherein generating the selected item from the first item is performed at the same time that the icon is being displayed.

12. The method of claim 11, wherein generating the selected item comprises generating the selected item by selecting the first item.

13. The method of claim 11, wherein the first item is an image outputted by the first application.

14. The method of claim 11, wherein enabling the second application to utilize the selected item comprises enabling the second application to utilize the selected item by receiving the selected item in response to selection of the icon.

15. The method of claim 14, wherein enabling the second application to utilize the selected item comprises enabling the second application to utilize the selected item by pressing the icon.

16. The method of claim 11, wherein the second application is a photo management application.

17. The method of claim 11, wherein the second application is configured to display the selected item, to edit the second item, or both.

18. The method of claim 11, further comprising storing the selected item in a memory.

19. The method of claim 18, wherein enabling comprises enabling the second application to utilize the selected item by extracting the selected item from the memory.

20. The method of claim 11, wherein enabling comprises enabling the second application to utilize the selected item by extracting the selected item from the first application.

\* \* \* \* \*